Patented Dec. 30, 1952

2,623,869

UNITED STATES PATENT OFFICE 2,623,869

LINEAR POLY-4-AMINO-1,2,4 TRIAZOLES HEATED WITH A MONOCARBOXYLIC ACID OR CERTAIN DERIVATIVES THEREOF

Friedrich Georg Kleinschrod and James Wotherspoon Fisher, Spondon, near Derby, England, assignors to British Celanese Limited, a corporation of Great Britain No Drawing. Application October 27, 1950, Serial No. 192,595. In Great Britain November 8, 1949

4 Claims. (Cl. 260—78.4)

This invention relates to improvements in the production of polymeric materials and is more particularly concerned with the production of polymers suitable for the formation of filaments and films.

In U. S. Patents Nos. 2,512,600 and 2,512,667, there are described processes for the production of polyaminotriazoles by condensing the dihydrazides of dicarboxylic acids in the presence of free hydrazine or by condensing the free dicarboxylic acid or its esters or anhydride with hydrazine in a proportion of more than two moles of hydrazine to each mole of dicarboxylic acid. If desired, the salt of the free dicarboxylic acid with hydrazine could be used with the requisite additional quantity of hydrazine. Generally it will be seen that the reagents for forming these polymers are such that on hydrolysis they yield a mixture of a dicarboxylic acid and hydrazine, the amount of hydrazine being sufficient to yield a polymer resistant to hydrolysis by hydrochloric acid. Generally the amount of hydrazine is more than 2 moles per mole of dicarboxylic acid. The specifications show how to carry out the condensation so that the products have good fibre-forming properties.

As indicated in the specifications, at the end of the condensation some of the terminal groups of the polymers consist of hydrazine groups so that the polymers are capable of further condensation to produce a longer linear molecule. Such a tendency to increase the length of the molecule may be eliminated by hydrolysing the terminal hydrazide groups. The polymers, either as produced or when hydrolysed in this way, still exhibit some tendency to cross-linking, presumably by reaction between terminal carboxy groups and the exocyclic amino groups disposed along the polymer chain. Such cross-linking can, as disclosed in U. S. Patent No. 2,512,624, be eliminated by hydrolysing the cross-linked polymer, e. g. with water or steam under pressure or with a mineral acid.

We have now found a means whereby polymers may be made in which the tendency to increase the length of the chain or to undergo cross-linking is much reduced or even eliminated so that the improved polymers are capable of being held at high temperatures, e. g. of the order of 260–270° C., for considerable periods of time, for example 10 or 15 minutes. According to the invention, this is achieved by adding to the mixture undergoing condensation a small quantity of a free monocarboxylic acid or the hydrazide thereof or an ester, anhydride or nitrile thereof, such addition taking place when the condensation has already been carried to a fairly high molecular weight, for example a molecular weight of 3000 or 4000, or an intrinsic viscosity of 0.25 and preferably 0.3–0.4 or higher. Intrinsic viscosity as referred to in this specification means the hyperbolic logarithm of the relative viscosity of a meta-cresol solution of a concentration of 1 gram of polymer per 100 ccs. of solution, measured at 25° C.

It is important that a considerable amount of condensation shall have taken place before the addition of the stabilising agent, since if the stabilising agent is added to the original reagents the polymer appears to become stabilised at a low molecular weight or intrinsic viscosity. For example, when condensing sebacic hydrazide in presence of hydrazine and using acetic hydrazide as stabiliser, where in the absence of the acetic hydrazide a given heating schedule would give rise to a polymer having an intrinsic viscosity of 0.7, the addition to the original reagents of 1% acetic hydrazide (about 3.1 molar per cent on the original sebacic acid or sebacic hydrazide) will stabilise the polymer at an intrinsic viscosity of 0.5. If, however, the condensation is carried out so as to produce a polymer of intrinsic viscosity of about 0.3 before addition of the acetic hydrazide, and 2%, on the weight of the sebacic hydrazide, of acetic hydrazide (about 6.2 molar per cent on the original sebacic acid or sebacic hydrazide) be then added and the condensation continued in the usual way, the final intrinsic viscosity is of the order of 0.55, i. e. higher than that which results from the addition of only half the quantity of acetic hydrazide to the original reagents. The effect, therefore, of adding acetic hydrazide after condensation has taken place seems to be different from that produced by adding the acetic hydrazide to the original reagents. If desired, the addition of the acetic hydrazide may be deferred until the intrinsic viscosity has reached 0.5–0.6 or even a value of 0.7 or any higher value near to that desired in the final polymer. The addition must, however, take place before the polymer reaches the desired viscosity since, unlike the polyamide-forming reaction, the polyaminotriazole condensation is not reversible.

When using acetic acid or anhydride or esters thereof as the stabiliser the same considerations apply. When, however, acetonitrile is used as stabiliser, it appears preferable to defer the addition until substantially the end of the polymerisation.

Instead of acetic acid or its derivatives, other monocarboxylic acids may be used, for instance propionic acid, butyric acid, valeric acid, stearic acid or other fatty acids, lactic acid or benzoic acid or their hydrazides, esters, anhydrides or nitriles.

The amount of stabilising agent to be added to achieve a given molecular weight of the polymer is not readily calculable as is the case in the known viscosity stabilisation of polyamides. Possibly this is because monocarboxylic hydrazides which are either added as such or formed in the reaction mixture with the free hydrazine present therein are themselves capable of condensation to make monomeric 4-amino-1.2.4-triazoles. Indeed this tendency may account for the difference between the effect of adding such an agent to the original reagents as compared to adding it to an already condensed mixture. However, the amount of stabiliser to be added to achieve a given final intrinsic viscosity is easily determined experimentally.

Generally for the production of filament-forming polymers the amount of stabiliser used should be less than 14 molar per cent based on the dicarboxylic acid (or derivative thereof) and, when the addition is made to a polymer having an intrinsic viscosity of 0.3 to 0.5 at the time of the addition, the amount required may be less than 6.5 molar per cent and is usually less than 5.5%. To produce a polymer of good filament-forming and cold-drawing properties a quantity of stabiliser of 3 molar per cent or less may be used.

The main advantage of stabilising the polymer in the manner described above is that the stabilised polymer is capable of withstanding melt spinning temperatures for longer periods than the polymer not so stabilised. It is therefore possible to maintain a larger pool of molten polymer in the melt spinning apparatus without danger of serious decomposition or increase in viscosity of the polymer or formation of a rubbery polymer. Another advantage is that it facilitates carrying out the final stages of the polymerisation itself under atmospheric pressure or under vacuum, or in other words reduces the tendency under these conditions to obtain a polymer of poor quality and thus facilitates removal of excess hydrazine or by-product ammonia and water.

Preferably according to the present invention the amount of stabiliser added and the stage at which it is added are such that the final polymer is fibre-forming, i. e. has an intrinsic viscosity of 0.3–0.4 or above. In the best method of carrying out the invention, the quantity of stabiliser and stage at which it is added are adjusted so that the final polymer has an intrinsic viscosity of 0.6 upwards and gives on melt spinning filaments which have good cold-drawing properties.

While sebacic acid has been mentioned above as the dicarboxylic acid for forming the polymers, other dicarboxylic acids may be used, for example pimelic acid, suberic acid, azelaic acid, diphenic acid, phenylene-1.4-diacetic acid, sulphone-$\gamma.\gamma'$-dibutyric acid, sulphone-$\delta.\delta'$-divaleric acid and sulphone-$\zeta.\zeta'$-di-oenanthic acid.

The following examples illustrate the invention but are not to be considered as limiting it in any way:

*Example 1*

A polyaminotriazole of a fairly low degree of polymerisation was obtained as follows: 200 parts by weight of sebacic acid and 150 parts by weight of 60% aqueous hydrazine were heated in an autoclave slowly to 210° C. during a period of 3–4 hours. The autoclave was then kept for another 10 hours at this temperature. The product obtained had a melting point in the neighborhood of 260° C. and the intrinsic viscosity of a variety of products prepared in this way varied between 0.35 and 0.40.

100 parts by weight of a low polymer prepared in this way were heated in a closed autoclave together with 5 parts by weight of 60% aqueous hydrazine and 1 part by weight of acetic acid hydrazide to a temperature of 230° C. for 5 hours. The product obtained had an intrinsic viscosity of 0.65 and showed good fibre-forming and cold-drawing properties. The product was capable of withstanding a temperature of 280° C. for 15 minutes.

*Example 2*

100 parts by weight of a low polymer prepared as described in Example 1 were heated in a closed autoclave together with 20 parts by weight of 60% aqueous hydrazine and 1.3 parts by weight of acetic hydrazide for a period of 5 hours. The product obtained had an intrinsic viscosity of 0.62, showed good fibre-forming and cold-drawing properties and was capable of withstanding a temperature of 280° C. for 15 minutes.

*Example 3*

100 parts by weight of a sample of a low polymer prepared as described in Example 1 were heated in a closed autoclave together with 6 parts by weight of 60% aqueous hydrazine and 3 parts by weight of acetic hydrazide to a temperature of 230° C. for 6 hours. The product had an intrinsic viscosity of nearly 0.6 and showed good fibre-forming and cold-drawing properties; it was capable of withstanding a temperature of 280° C. for 15 minutes.

*Example 4*

100 parts by weight of a sample of a low polymer prepared in the manner described in Example 1 were heated in a closed autoclave together with 15 parts by weight of 60% aqueous hydrazine and 0.71 parts by weight of acetic acid to a temperature of 230° C. for 5 hours. The product, which had an intrinsic viscosity of nearly 0.6, showed good fibre-forming and cold-drawing properties and was capable of withstanding a temperature of 280° C. for 15 minutes.

*Example 5*

100 parts by weight of a low polymer prepared as described in Example 1 were heated in a closed autoclave together with 10 parts by weight of hydrazine and 0.96 parts by weight of acetonitrile to a temperature of 230° C. for 5 hours. The product had an intrinsic viscosity of 0.6, showed good fibre-forming and cold-drawing properties and was capable of withstanding a temperature of 280° C. for 15 minutes.

Having described our invention, what we desire to secure by Letters Patent is:

1. Process for the production of linear poly-4-amino-1.2.4-triazoles, which comprises heating together reagents which on hydrolysis yield a mixture of dicarboxylic acid and sufficient hydrazine to yield a polymer resistant to hydrolysis by hydrochloric acid and, when the intrinsic viscosity of the polymer, the hyperbolic logarithm of the relative viscosity of a meta-cresol solution in a concentration of 1 gram of polymer per 100 ccs. of solution, measured at 25° C., has reached a value of at least 0.25, adding a quantity, less than 14 molar per cent based on the dicarboxylic acid, of a substance selected from the group consisting of monocarboxylic acids, their hydrazides, esters, anhydrides and nitriles, and continuing the heating until a polymer is produced.

2. Process for the production of linear poly-4-amino-1.2.4-triazoles, which comprises heating together reagents which on hydrolysis yield a mixture of dicarboxylic acid and sufficient hydrazine to yield a polymer resistant to hydrolysis by hydrochloric acid and, when the intrinsic viscosity of the polymer, the hyperbolic logarithm of the relative viscosity of a meta-cresol solution in a concentration of 1 gram of polymer per 100 ccs. of solution, measured at 25° C., has reached a value of at least 0.3, adding a quantity, less than 5.5 molar per cent based on the dicarboxylic acid, of a substance selected from the group consisting of monocarboxylic acids, their hydrazides, esters, anhydrides and nitriles, and continuing the heating until a polymer is produced.

3. Process for the production of linear poly-4-amino-1.2.4-triazoles, which comprises heating together reagents which on hydrolysis yield a mixture of dicarboxylic acid and sufficient hydrazine to yield a polymer resistant to hydrolysis by hydrochloric acid and, when the intrinsic viscosity, the hyperbolic logarithm of the relative viscosity of a meta-cresol solution in a concentration of 1 gram of polymer per 100 ccs. of solution, measured at 25° C., has reached a value of at least 0.25, adding a quantity, less than 3 molar per cent based on the dicarboxylic acid but insufficient to prevent the polymer reaching the fibre-forming stage, of a substance selected from the group consisting of monocarboxylic acids, their hydrazides, esters, anhydrides and nitriles, and continuing the heating until the polymer is fibre-forming.

4. Process for the production of linear poly-4-amino-1.2.4-triazoles, which comprises heating together sebacic dihydrazide and hydrazine and, when the intrinsic viscosity, the hyperbolic logarithm of the relative viscosity of a meta-cresol solution in a concentration of 1 gram of polymer per 100 ccs. of solution, measured at 25° C., has reached a value of at least 0.25, adding a quantity, less than 3 molar per cent based on the dicarboxylic acid but insufficient to prevent the polymer reaching the fibre-forming stage, of acetic hydrazide, and continuing the heating until the polymer is fibre-forming.

FRIEDRICH GEORG KLEINSCHROD.
JAMES WOTHERSPOON FISHER.

REFERENCES CITED

The following references are of record in the file of this patent:

UNITED STATES PATENTS

| Number | Name | Date |
|---|---|---|
| 2,512,600 | Bates et al. | June 27, 1950 |
| 2,512,628 | Fisher et al. | June 27, 1950 |
| 2,512,667 | Moncrieff | June 27, 1950 |